United States Patent [19]

Stanley et al.

[11] Patent Number: 5,965,827
[45] Date of Patent: Oct. 12, 1999

[54] SEAT BELT TENSION MEASUREMENT DEVICE USING A BEND SENSOR

[75] Inventors: James G. Stanley, Novi; Vinh H. Tran, West Bloomfield, both of Mich.

[73] Assignee: Automotive Systems Laboratory, Inc., Farmington Hills, Mich.

[21] Appl. No.: 09/075,729

[22] Filed: May 11, 1998

Related U.S. Application Data

[60] Provisional application No. 60/046,227, May 12, 1997.

[51] Int. Cl.⁶ .................................................. G01L 1/26
[52] U.S. Cl. ...................................................... 73/862.391
[58] Field of Search ................... 73/862.391, 862.42, 73/862.451, 862.46, 862.471, 862.472, 862.473, 862.474, 862.392, 862.541, 159

[56] References Cited

U.S. PATENT DOCUMENTS

| | | | |
|---|---|---|---|
| 2,343,229 | 2/1944 | Stone et al. | 73/862.472 X |
| 3,675,482 | 7/1972 | Hewitt | 73/862.471 |
| 3,720,100 | 3/1973 | Grunbaum | 73/862.451 |
| 3,817,093 | 6/1974 | Williams . | |
| 3,834,225 | 9/1974 | Burchett | 73/862.472 X |
| 4,141,245 | 2/1979 | Brandstetter | 73/862.46 |
| 4,437,352 | 3/1984 | Deborde et al. | 73/862.472 |
| 4,677,861 | 7/1987 | Bartholomew | 73/862.541 |
| 4,759,226 | 7/1988 | Leurer | 73/862.639 X |
| 4,805,467 | 2/1989 | Bartholomew | 73/862.541 |
| 4,979,400 | 12/1990 | Bartholomew | 73/862.541 |
| 5,019,017 | 5/1991 | Monch | 73/862.391 |
| 5,181,739 | 1/1993 | Bauer et al. | 73/862.391 X |
| 5,329,822 | 7/1994 | Hartel et al. | 73/862.391 X |
| 5,629,487 | 5/1997 | Nucke et al. | 73/862.391 X |

OTHER PUBLICATIONS

UniForce Technical Notes and Sensor Design Guide, 3424 Touhy Avenue, Chicago, IL 60645–2717, pp. 1 through 9.
IMRC Prescon Sensors with Low Threshold Actuation, International Microelectronics Research Corporation, 11132 E. Edison St., Tucson AZ 85749–9773, pp. 1 thu 3 also 3 usage and application pages.
FSR Integration Guide & Evaluation Parts Catalog with Suggested Electrical Interfaces, Interlink Electronics, 546 Flynn Road, Camarillo, CA 93012, pp. 1 through 27.
Uniforce Technical Notes #101 (Rev.Jul. 95), Force Imaging Technologies, 3424 Touhy Avenue, Chicago, IL 60645–2717, pp. 1 through 4.
Tactile Sensing, 1990's Style by Wesley R. Iversen, Assembly Magazine, Feb.–Mar. 1993 Issue, pp. 23 through 26.

*Primary Examiner*—George Dombroske
*Assistant Examiner*—Jewel V. Thompson
*Attorney, Agent, or Firm*—Lyon, P.C.

[57] ABSTRACT

A vehicle seat belt tension measurement apparatus comprises a seat belt deflecting device that forces a seat belt to travel a circuitous path. As seat belt tension increases the deflecting device is displaced. A bend sensor having an output signal responsive to a change in the radius of curvature thereof is secured to the deflecting device at a point subject to flexure as a result of increased seat belt tension. An air bag control system processor operatively coupled to the bend sensor inhibits the deployment of the air bag upon detection of a predetermined seat belt tension.

9 Claims, 3 Drawing Sheets

SEAT BELT TENSION MEASUREMENT DEVICE USING A BEND SENSOR

CROSS REFERENCE TO RELATED APPLICATIONS

The instant application claims the benefit of copending U.S. Provisional Application Ser. No. 60/046,227, filed May 12, 1997, and entitled "Belt Tension Device Using Bend Sensor".

TECHNICAL ART

The instant invention relates generally to automotive passenger restraint systems and more specifically to a system for measuring seat belt tension in a vehicle utilizing a bend sensor.

BACKGROUND OF THE INVENTION

Automotive manufacturers and the National Highway Transportation Safety Association are investigating methods to disable vehicle air bags in situations where they may cause more harm than good. Typically, airbags have been developed to deploy with enough force to restrain a 175 lb. adult in a high velocity crash. Deployment of the same air bags when children are seat occupants may cause serious injury due to the force generated upon inflation of the bag.

As a result, seat weight sensors and systems are being developed in an attempt to determine when the passenger seat occupant is a child. Such systems should identify when the occupant is small, or even when a child is in a rear facing infant seat, a forward facing child seat or a booster seat. Occupant weight measurement when a child seat is present is further complicated by the downward force applied to the child seat by the tension of a seat belt. When a child seat is strapped tightly, the seat belt forces the child seat into the vehicle seat and can often artificially increase the measured weight, which may lead to air bag deployment when children or infants are present in the seat.

Therefore, a variety of methods have been used for seat belt tension measurement. Copending U.S. Provisional Application Ser. No. 60/067,071 entitled "Villari Effect Seat Belt Tension Sensor", and copending U.S. Provisional Application Ser. No. 60/070,319 entitled "Compressive Villari Effect Seat belt Tension Sensor", both assigned to the assignee of the instant invention, disclose two seat belt tension measurement systems utilizing sensors that operate on the principle known as the Villari effect. The Villari effect refers to the change of magnetic permeability responsive to compression or tensile stresses of certain materials with magnetostrictive properties. By measuring the magnetic field strength in magnetostrictive material placed in line with a seat belt mechanism, for example in a seat belt latch or a seat belt retractor, the relative tension in the belt may be calculated.

Tension measurement mechanisms have also been incorporated in the buckle of the seat belt. In one embodiment, a sliding buckle is biased with a spring. When the belt is under heavy tension, the buckle pulls forward to control a switch that provides feedback to a vehicle processor.

The aforementioned seat belt tension measurement methods suffer from a number of disadvantages. Initially, a great number of additional parts are required for seat belt retractors or buckle configurations thereby adding complexity and cost to vehicle assembly and providing considerable difficulty in retrofitting existing vehicles. Additionally, many prior art seat belt tension systems provide only for a threshold level of tension detection.

The present invention may be used to detect whether the seat belt is under high tension thereby indicating that an infant seat or another inanimate object is belted into the seat. The instant invention can be used in conjunction with a seat weight sensor to determine whether an airbag should be deployed for a given occupant. Additionally, the instant invention provides a continuous measurement of seat belt tension in contrast to the threshold detection of some prior art belt tension devices.

SUMMARY OF THE INVENTION

The instant invention overcomes the aforementioned problems by providing a vehicle seat belt tension measurement system incorporating a bend sensor capable of detecting the curvature induced in a material responsive thereto by changing tension in a seat belt.

The present invention measures tension by routing a seat belt through a circuitous path wherein the seat belt travels over a deflecting device thereby forcing the belt to travel out of a straight line path. The deflecting device is thereby subjected to bending stress as the amount of tension in the seat belt increases.

The deflecting device comprises a plurality of belt guides for routing the seat belt over a shaped flat spring o, alternatively, a shaped block of compressible, elastic foam material. As tension in the seat belt increases, the flat spring is displaced downwardly or the foam material is compressed.

A "bend" sensor secured to the flat spring or disposed within the foam material is responsive to the amount of curvature induced in the deflecting device by the seat belt as belt tension fluctuates and displaces the device. The bend sensor provides an output signal resulting from a variable electrical resistance proportional to the curvature induced in the sensor. The output signal is operatively coupled to the input of a microprocessor. The microprocessor is provided with an output, or a plurality thereof, to an airbag control system whereby an output signal is generated to inhibit deployment of an airbag or modify its inflation characteristics upon detection of high belt tension.

The bend sensor comprises a material having electrical resistance responsive to a change in radius of curvature, secured to the flat spring or elastic foam at a point where the bend sensor follows the curvature of the deflecting device that changes responsive to tension in the belt. The bend sensor material generates a variable electrical resistance output signal. The resistance through the bend sensor material varies in proportion to the radius of curvature of the material. Accordingly, as the curvature in the deflecting device varies with fluctuations in seat belt tension, the curvature of the bend sensor and, therefore, it's output signal changes.

By the microprocessor, seat belt tension is calculated from the variable resistance signal. The belt tension calculated by the microprocessor is used to determine the presence of an inanimate object or an infant seat. If a belt tension greater than ten pounds is detected, for example, it is unlikely that a person is present in the vehicle seat because belt tensions greater than ten pounds are generally uncomfortable for passengers. Accordingly, when high belt tension is detected, the microprocessor generates an output to the air bag control system that inhibits air bag deployment.

By sensing the amount of tension present in the seat belt, the deployment of an airbag may be inhibited if the tension is such that either an infant seat or a small occupant is likely to be present and at risk of injury from air bag deployment.

Therefore, a system that can reliably predict the amount of tension present in a seat belt is advantageous in vehicle safety systems.

Furthermore, because commercially available bend sensor materials have proven reliable in sensor technology applications, the instant invention provides a robust seat belt tension measurement system readily retrofitted to existing automobiles without the need for alteration or re-qualification of existing seat belt systems. This provides a significant advantage to automotive manufacturers by eliminating the cost and time involved in qualifying a safety restraint system to meet federal standards.

Additionally, the present invention incorporates a simple mechanical design that will accurately measure seat belt tension even when a twist occurs in the seat belt webbing. Even when misaligned, a high tension seat belt will displace the deflecting device and thereby provide a tension measurement.

Therefore, one object of the instant invention is to provide a seat belt tension measurement system that incorporates reliable sensor technology to measure seat belt tension and provide a signal to an airbag control system to inhibit deployment of an airbag when an infant seat is present.

Yet another object of the instant invention is to provide a seat belt tension measurement system having a simple mechanical design that does not require re-qualification of the seat belt system prior to use by automotive manufacturers.

A yet further object of the instant invention is to provide a seat belt tension measurement system that remains operable when the seat belt webbing becomes twisted within the sensor housing.

A yet further object of the instant invention is to provide a seat belt tension measurement system that generates a continuous measurement of seat belt tension rather than threshold-type tension measurement.

The instant invention will be more fully understood after reading the following detailed description of the preferred embodiment with reference to the accompanying drawing figures. While this description will illustrate the application of the instant invention in the context of an automotive safety restraint system, it will be readily understood by one of ordinary skill in the art that the instant invention may also be utilized in other tension measurement systems.

DETAILED DESCRIPTION OF THE PREFERRED EMBODIMENTS

Figure 1:
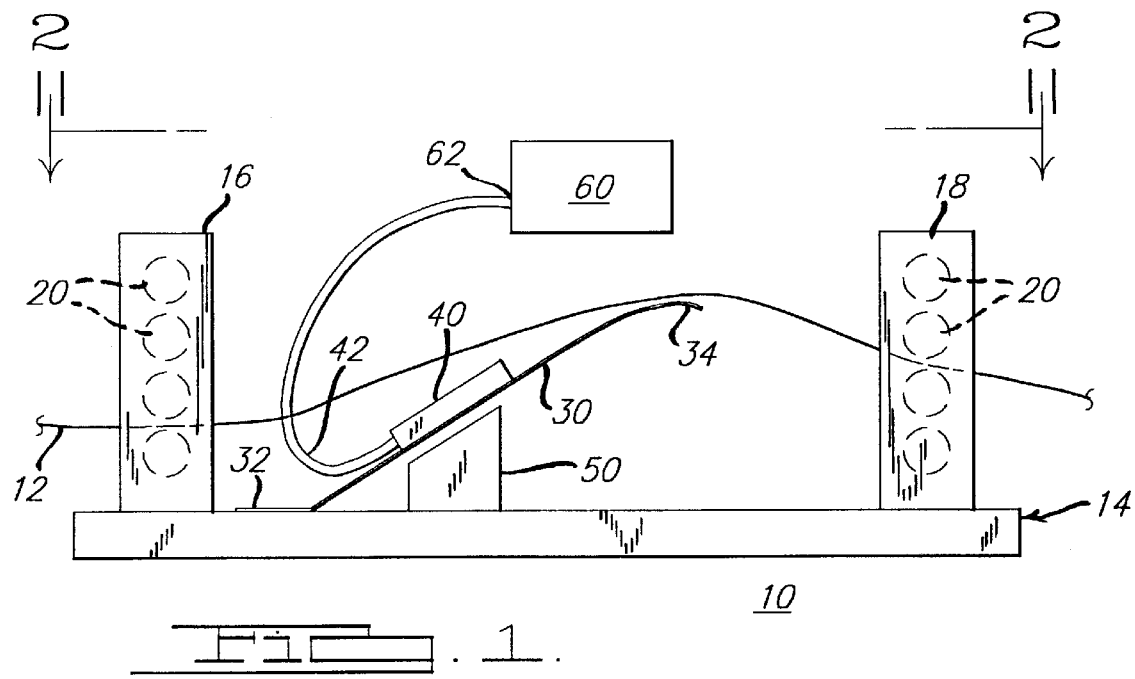
FIG. 1 is a view of the preferred constructed embodiment of the instant invention.
Figure 2:
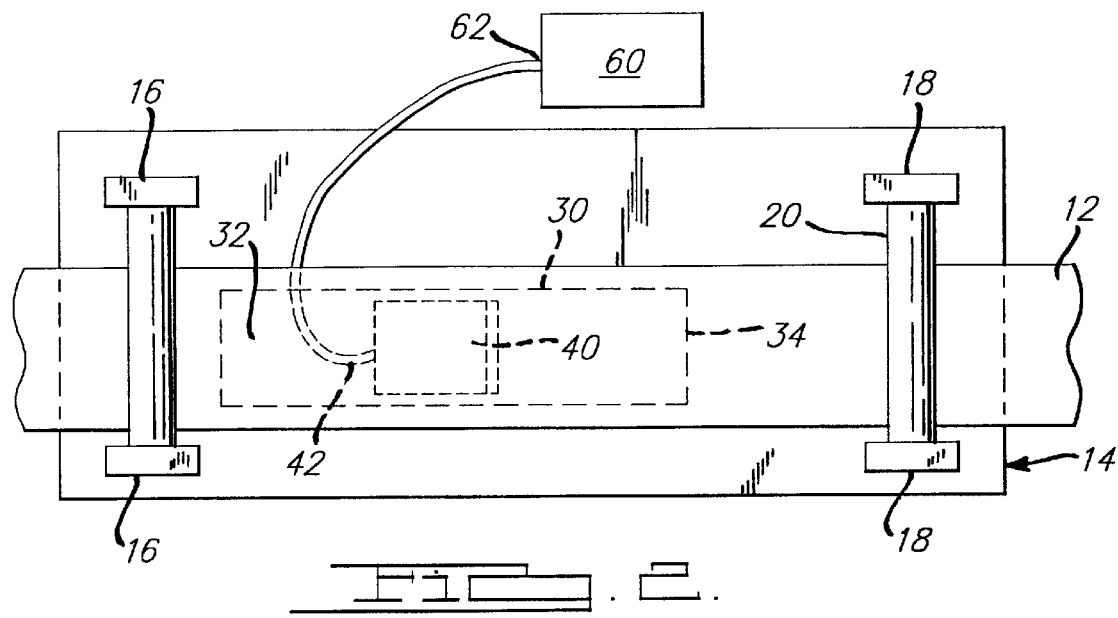
FIG. 2 is a view of the invention taken along line 2—2 of FIG. 1.

Referring to FIGS. 1 and 2, and in accordance with a preferred constructed embodiment of the instant invention, a tension measurement system 10 for a seat belt 12 comprises a base 14 having a pair of spaced parallel front guide blocks 16 and a pair of spaced parallel rear guide blocks 18 depending therefrom. The parallel spaced front guide blocks 16 and the parallel spaced rear guide blocks 18 each have a plurality of cylindrical guide pins 20 disposed therebetween for guiding the seat belt 12.

A shaped flat spring 30 has a first end 32 secured to the base 14 between the front and rear guide block pairs 16 and 18 respectively, and a free end 34 extending upwardly from the base 14 and disposed between the front 16 and rear 18 guide block pairs.

A bend sensor 40 is secured to the shaped flat spring 30 using an electrically conductive adhesive at a point on the shaped flat spring 30 where the bend sensor 40 follows the curvature thereof when the flat spring free end 34 is biased toward the base 14. The bend sensor 40 comprises a flexible material having an output 42 responsive to a change in curvature of the bend sensor 40. As the bend sensor 40 is subjected to flexure, the radius of curvature of the flexible material changes thereby varying the electrical resistance as measured at the output 42. The bend sensor 40 typically has a nominal unflexed resistance variable up to a predetermined maximum resistance when flexed 90 degrees.

The seat belt 12 is routed between the front guide blocks 16, either over or under at least one of the plurality of guide pins 20 disposed therebetween, over the flat spring 30 free end 34, between the rear guide blocks 18, and either over or under at least one of the plurality of guide pins 18 disposed therebetween. As shown in FIG. 1, a pivot block 50 is secured to the base 14 directly beneath the shaped flat spring 30 and the bend sensor 40 secured thereto. The pivot block 50 provides a fulcrum around which the flat spring 30 and the bend sensor 40 are flexed when the free end 34 of flat spring 30 is biased downwardly.

In operation, as the seat belt 12 tension increases, the free end 34 of the flat spring 30 is biased downwardly towards the base 14, thereby inducing curvature in the bend sensor 40. The pivot block 50 increases the amount of curvature induced in the bend sensor 40 for a given amount of movement of the free end 34 of the flat spring 30, thereby causing a variation in the amount of electrical resistance at the output 42.

Alternatively, bend sensor 40 can comprise a known in the art proximity sensor 52, for example a hall effect proximity device, secured to the base 14 at a point relative to the flat spring 30 for sensing the free end 34 thereof when it is biased downwardly under high seat belt 12 tension. The proximity sensor 52 generates an output signal 54 responsive to the position of flat spring free end 34.

An air bag control system processor 60 is provided having an input 62 operatively coupled to the output 42 of the bend sensor 40. The processor 60 is suitably programmed to calculate a seat belt 12 tension proportional to the electrical resistance measured at the input 62. The processor 60 is further programmed to inhibit the deployment of an air bag upon detection of a predetermined amount of tension in the seat belt as measured by the bend sensor 40 indicative of the presence of a tightly belted child seat. Alternatively, processor input 62 is operatively coupled to the output 54 generated by proximity sensor 52 responsive to the position of flat spring free end 34.

The air bag control system processor 60 comprises an analog or digital microprocessor or any equivalent thereof. Although the preferred embodiment of the instant invention utilizes a conventional digital microprocessor, it is readily understood by one having ordinary skill in the art that alternative means such as relay logic circuitry, analog processors, analog to digital converters and TTL logic circuitry may be employed as processor means to practice the instant invention.

Figure 3:
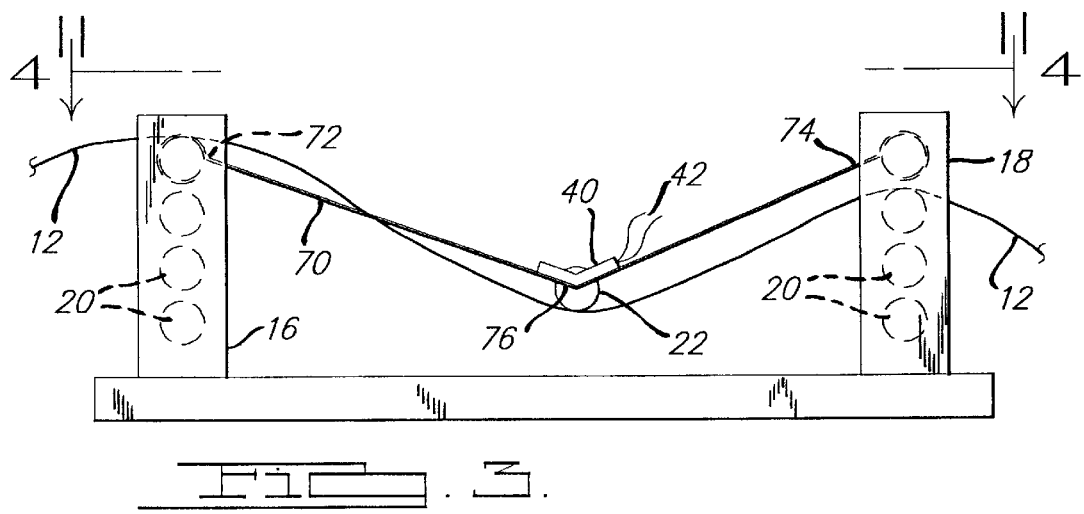
FIG. 3 is a view of an alternative embodiment of the instant invention.
Figure 4:
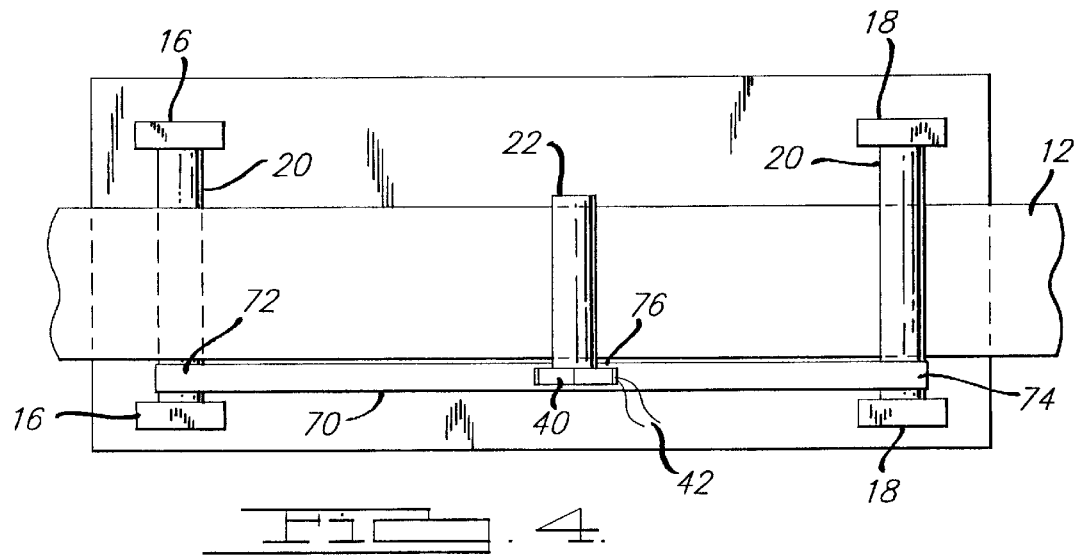
FIG. 4 is a view of the invention taken along line 4—4 of FIG. 3.

Referring to FIGS. 3 and 4, and in accordance with an alternative embodiment of the instant invention, a shaped flat spring 70 has a first end 72 secured to one of the plurality of guide pins 20 disposed between the parallel spaced front guide blocks 16 and a second end 74 secured to one of the plurality of cylindrical guide pins 20 disposed between the parallel spaced rear guide blocks 18. The shaped flat spring 70 is further provided with a center section 76 having an obtuse angle therein.

The bend sensor 40 is secured to the flat spring 70 proximate the center section 76 thereof. A cylindrical center pin 22 is secured to and depends from the center section 76 of the flat spring 70 for guiding the seat belt 12.

In operation, the seat belt 12 is routed between the front guide blocks 16 and through a pair of the plurality of guide pins 20, underneath the center pin 22, and finally between the rear guide blocks 18 and through a pair of the guide pins 20 disposed therebetween. As the tension in the seat belt 12 increases, the seat belt 12 forces the center pin 22 and the center section 76 of the flat spring 70 to move upwardly, thereby changing the radius of curvature of the bend sensor 40 and varying the electrical resistance thereof as measured at the output 42.

Figure 5:
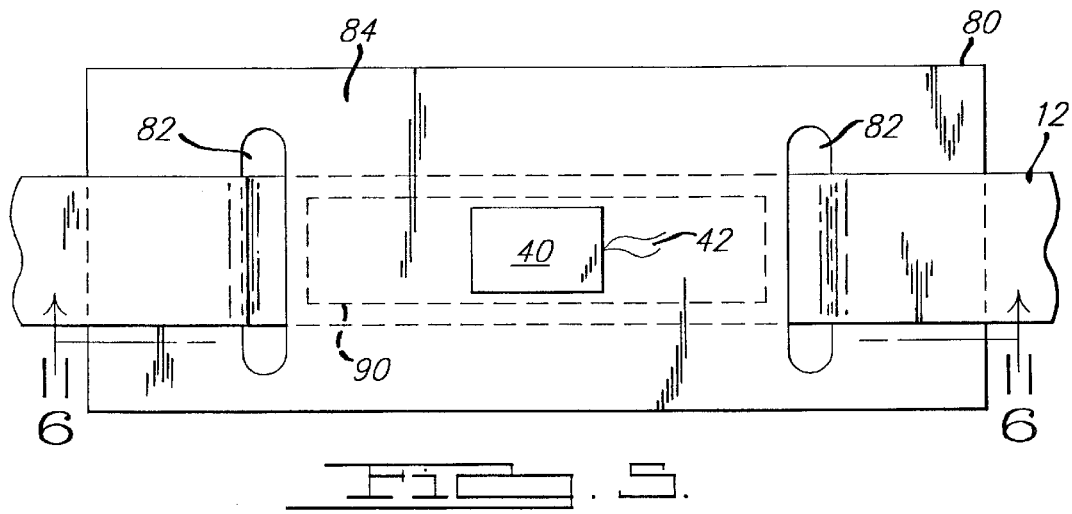
FIG. 5 is a view of an alternative embodiment of the instant invention.
Figure 6:
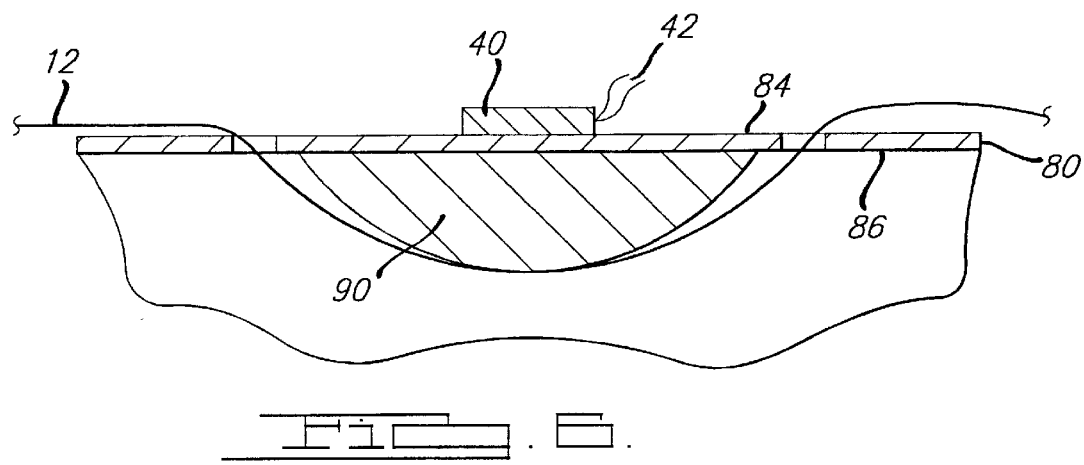
FIG. 6 is a view of the invention taken along line 6—6 of FIG. 5.

In an alternative embodiment of the instant invention as shown in FIGS. 5 & 6, a substantially rectangular flat spring 80 is provided having a pair of spaced slots 82 therein. A bend sensor 40 is secured to a first side 84 of the flat spring 80 between the pair of spaced slots 82. A shaped pivot block 90 is secured to a second side 86 of the flat spring 80 between the spaced slots 82.

The seat belt 12 is routed through one slot 82 of the flat spring 80, under the shaped pivot block 90, and then through the second slot 82 of the flat spring 80. In operation, as the tension in the seat belt 12 increases, the seat belt 12 forces the shaped pivot block 90 against the flat spring 80 thereby flexing the flat spring 80 upwardly against the bend sensor 40. As the radius of curvature of the bend sensor 40 varies, the electrical resistance thereof as measured at the output 42 also varies, thereby providing a measure of belt tension.

Figure 7:
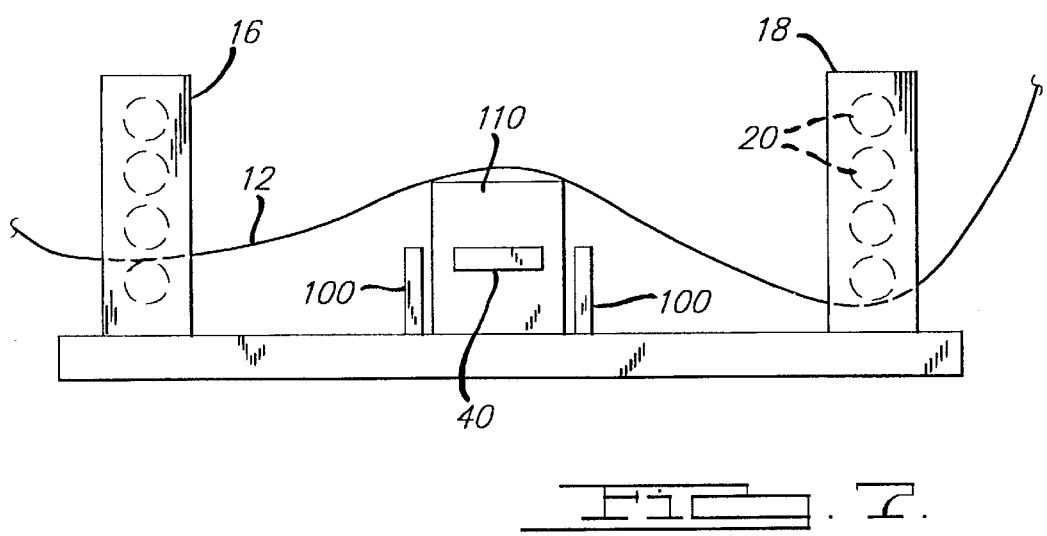
FIG. 7 is a view of an alternative embodiment of the instant invention.

As seen in FIG. 7, an alternative belt tension measurement system 10 is provided having a base 14 having a pair of spaced parallel front guide blocks 16 and a pair of spaced parallel rear guide blocks 18 depending therefrom. The parallel spaced front guide blocks 16 and rear guide blocks 18 each have a plurality of cylindrical guide pins 20 disposed therebetween.

A pair of parallel spaced support walls 100 having a substantially rectangular foam block 110 disposed therebetween, depend from the base 14 between the front guide blocks 16 and the rear guide blocks 18. The foam block 110 has a bend sensor 40 oriented parallel to the base 14 molded therein, and is preferably made from a rigid compressible foam material such as polyurethane. The foam block 110 must have a height above the base 14 greater than the height of the support walls 100 for reasons explained hereinbelow.

In operation, the seat belt 12 is routed between a pair of the plurality of guide pins 20 disposed between the front guide blocks 16, over the support walls 100 and the foam block 110 positioned therebetween, and then between a pair of the plurality of guide pins 20 disposed between the rear guide blocks 18.

As the tension in the seat belt 12 increases the foam block 110 and the bend sensor 40 therein are compressed thereby changing the radius of curvature of the bend sensor 40 and varying the electrical resistance as measured at the output 42 thereof. The height of the foam block 110 must be greater than that of the support walls 100 to enable the seat belt 12 to compress the foam block 110 and change the curvature of the bend sensor disposed therein as tension in the seat belt 12 varies.

While specific embodiments of the instant invention have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A seat belt tension measurement device comprising:
   a base having a first pair of spaced parallel front guide blocks and a second pair of spaced parallel rear guide blocks depending therefrom, the front guide block pair having a plurality of cylindrical guide pins disposed therebetween, and the rear guide block pair having a plurality of cylindrical guide pins disposed therebetween;
   a shaped flat spring having a first end mounted to said base between said first and second guide block pairs, and a second free end positioned above said base; and
   a bend sensor having an output responsive to the radius of curvature thereof secured to said shaped flat spring at a point where said bend sensor follows the curvature of said flat spring when the free end thereof is biased downwardly, wherein said seat belt is routed between two of the plurality of guide pins disposed between the front guide block pair, over said shaped flat spring free end to produce relative motion thereof, and between two of the plurality of guide pins disposed between the rear guide block pair.

2. A seat belt tension measurement device as in claim 1 further comprising:
   a pivot block secured to said base beneath said shaped flat spring for inducing curvature in said shaped flat spring and said bend sensor when the flat spring free end is biased downwardly.

3. A seat belt tension measurement device comprising:
   a base having a first pair of spaced parallel front guide blocks and a second pair of spaced parallel rear guide blocks depending therefrom, the front guide block pair having a plurality of cylindrical guide pins disposed therebetween, and the rear guide block pair having a plurality of cylindrical guide pins disposed therebetween;
   a shaped flat spring having first and second ends and a center section having an angle therein, the first end secured to a one of the plurality of guide pins disposed between the front guide block pair and the second end secured to a one of the plurality of guide pins disposed between the rear guide block pair;
   a cylindrical center guide pin secured to and depending from the center section of said shaped flat spring; and
   a bend sensor having an output responsive to the radius of curvature thereof secured to the center section of said shaped flat spring, wherein said seat belt is routed over one of the plurality of guide pins disposed between the front guide blocks, under said center guide pin, and over one of the plurality of guide pins disposed between the rear guide blocks whereby tension in said seat belt causes relative motion of the center section of said shaped flat spring with respect to the first and second ends thereof, causing a change in the curvature of said bend sensor.

4. A seat belt tension measurement device comprising:

a flat spring having first and second spaced slots therein for the acceptance of a seat belt and having top and bottom sides;

a shaped pivot block secured to the bottom side of said flat spring between the spaced slots therein; and a bend sensor having an output responsive to the radius of curvature thereof secured between the first and second spaced slots on the top side of said flat spring, wherein said seat belt is routed through the first slot, under said shaped pivot block, and through the second slot whereby tension in said seat belt causes said pivot block to flex said flat spring and change the curvature of said bend sensor thereon.

5. A seat belt tension measurement device comprising:

a base having a first pair of spaced parallel front guide blocks and a second pair of spaced parallel rear guide blocks depending therefrom, the front guide block pair having a plurality of cylindrical guide pins disposed therebetween, and the rear guide block pair having a plurality of cylindrical guide pins disposed therebetween;

first and second spaced parallel support walls depending from said base and disposed between the first and second guide block pairs;

a shaped resilient foam block having a height greater than said parallel support walls, said block disposed between said parallel support walls; and a bend sensor having an output responsive to the radius of curvature thereof disposed within said foam block parallel to said base, wherein said seat belt is routed over one of the plurality of guide pins disposed between the front guide blocks, over said first support wall, said foam block, and said second support wall, and over one of the plurality of guide pins disposed between the rear guide blocks whereby tension in the belt causes compression of said foam block and a change in the curvature of said bend sensor therein.

6. The seat belt tension measurement device of claim 1 further comprising:

an air bag control system processor having an input operatively coupled to the output of said bend sensor wherein said processor inhibits the deployment of said air bag upon detection of a predetermined seat belt tension as measured by said bend sensor.

7. The seat belt tension measurement device of claim 2 further comprising:

an air bag control system processor having an input operatively coupled to the output of said bend sensor wherein said processor inhibits the deployment of said air bag upon detection of a predetermined seat belt tension as measured by said bend sensor.

8. The seat belt tension measurement device of claim 3 further comprising:

an air bag control system processor having an input operatively coupled to the output of said bend sensor wherein said processor inhibits the deployment of said air bag upon detection of a predetermined seat belt tension as measured by said bend sensor.

9. The seat belt tension measurement device of claim 4 further comprising:

an air bag control system processor having an input operatively coupled to the output of said bend sensor wherein said processor inhibits the deployment of said air bag upon detection of a predetermined seat belt tension as measured by said bend sensor.

* * * * *